US009423256B2

(12) United States Patent
Le Scouarnec et al.

(10) Patent No.: US 9,423,256 B2
(45) Date of Patent: Aug. 23, 2016

(54) POINTING AND NAVIGATION SYSTEM AND PROCESS FOR CALIBRATING THE POINTING AND NAVIGATION SYSTEM

(71) Applicants: IXBLUE, Marty le Roi (FR); ECOLE NATIONALE SUPERIEURE DE TECHNIQUES AVANCEES BRETAGNE, Brest (FR)

(72) Inventors: Romain Le Scouarnec, Puteaux (FR); Thomas Touze, Irvillac (FR); Jean-Baptiste Lacambre, Paris (FR); Nicolas Seube, Brest (FR)

(73) Assignees: IXBLUE, Marly le Roi (FR); ECOLE NATIONALE SUPERIEURE DE TECHNIQUES AVANCEES BRETAGNE, Brest (FR)

( * ) Notice: Subject to any disclaimer, the term of this patent is extended or adjusted under 35 U.S.C. 154(b) by 0 days.

(21) Appl. No.: 14/316,957

(22) Filed: Jun. 27, 2014

(65) Prior Publication Data
US 2015/0006074 A1    Jan. 1, 2015

(30) Foreign Application Priority Data
Jun. 28, 2013    (FR) ...................................... 13 56346

(51) Int. Cl.
*F41G 1/50*       (2006.01)
*G01C 21/20*    (2006.01)
*G01C 21/16*    (2006.01)

(52) U.S. Cl.
CPC ............. *G01C 21/20* (2013.01); *G01C 21/165* (2013.01)

(58) Field of Classification Search
CPC ..... G01C 21/165; G01C 25/00; G01S 7/497; G01S 19/49; G01S 5/16; G01S 17/936; G01S 19/42; H04N 13/0239; F41G 1/50; G06F 3/0317

USPC ............... 701/468, 480; 348/113, 47; 356/1, 356/141.4, 501; 73/1.37; 702/93; 345/158
See application file for complete search history.

(56) References Cited

U.S. PATENT DOCUMENTS

2002/0154294 A1*  10/2002  Hedges ..................... G01S 5/16
                                                                 356/141.4
2003/0115930 A1*   6/2003  Kappi ..................... G01C 19/56
                                                                 73/1.37

(Continued)

OTHER PUBLICATIONS

Soloviev et al, "Tight Coupling of Laser Scanner and Inertial Measurements for a Fully Autonomous Relative Navigation Solution" Journal of the Institute of Navigation vol. 54, No. 3, Fall 2007 Printed in the U.S.A.*

(Continued)

*Primary Examiner* — Yuri Kan
(74) *Attorney, Agent, or Firm* — Young & Thompson

(57) ABSTRACT

A method of calibration of a navigation and pointing system (10) including a navigation unit (11) integrally connected to a pointing device (12), the navigation unit being configured to measure the orientation of a navigation reference system (21), the pointing device (12) being configured to measure a signal in a pointing reference system (22). The calibration method includes the following steps:

selecting a first planar surface (8) and a second planar surface (9);

acquiring measurements via the system by directing the pointing direction towards the first planar surface (8), and respectively towards the second planar surface (9), according to a plurality of predetermined orientations;

applying an algorithm for processing the measurements acquired at the previous step to extract therefrom the misalignment angles between the navigation reference system (21) and the pointing reference system (22).

14 Claims, 5 Drawing Sheets

(56) References Cited

U.S. PATENT DOCUMENTS

| | | | |
|---|---|---|---|
| 2007/0252814 A1* | 11/2007 | Lin ...................... | G06F 3/0317 345/158 |
| 2009/0070058 A1* | 3/2009 | Lin .......................... | F41G 1/50 702/93 |
| 2010/0053593 A1* | 3/2010 | Bedros .................. | G01S 17/936 356/5.01 |
| 2012/0176491 A1* | 7/2012 | Garin .................... | G01S 17/936 356/5.01 |
| 2014/0278078 A1* | 9/2014 | Cameron ................ | B66C 13/46 701/480 |
| 2014/0285631 A1* | 9/2014 | Janky ................. | H04N 13/0239 348/47 |

OTHER PUBLICATIONS

Soloviev (Pub.: Tight Coupling of Laser Scanner and Inertial Measurements for a Fully Autonomous Relative Navigation Solution, Journal of the Institute of Navigation; vol. 54, No. 3, Fall 2007; Printed in the U.S.A.).*

Rieger et al., "Boresight alignment method for mobile laser scanning systems", Riegl Laser Measurement Systems GmbH, 2008, www.riegl.com.

Skaloud et al., "Towards Automated Lidar Boresight Self-Calibration", Topo Lab, Ecole Polytechnique Federale de Lausane (EPFL), Station 18, 1015 Lausane, Switzerland.

French Search Report dated May 13, 2014, corresponding to the Foreign Priority Application No. 13 56346.

Andrey Soloviev, et al.; "Tight Coupling of Laser Scanner and Inertial Measurements for a Fully Autonomous Relative Navigation Solution"; vol. 54, No. 3; Dec. 1, 2007; pp. 189-205.

Marcus Hebel, et al.; "Simultaneous Calibration of ALS Systems and Alignment of Multiview of LiDAR Scans of Urban Areas"; vol. 50, No. 6; Jun. 1, 2012; pp. 2364-2379.

Chao Gao, et al.; "On-Line Calibration of Multiple LIDARs on a Mobile Vehicle Platform"; May 3-8, 2010; pp. 279-284.

Kristian Walker Morin; "Calibration of Airborne Laser Scanners"; Nov. 2002; pp. 1-125.

Kris Morin; "Post-Mission Adjustment Methods of Airborne Laser Scanning Data"; Apr. 19-26, 2002; pp. 1-12.

Jan Skaloud, et al.; Rigorous Approach to Bore-Sight Self-Calibration in Airborne Laser Scanning; Sep. 7, 2006; pp. 47-59.

Dipl.Ing.(FH) Thomas Thies; "A Vessel-Based Mobile Mapping System-From Sensor Integration to Multipurpose Products"; Feb. 28, 2011; pp. 1-132.

* cited by examiner

POINTING AND NAVIGATION SYSTEM AND PROCESS FOR CALIBRATING THE POINTING AND NAVIGATION SYSTEM

FIELD OF THE INVENTION

The present invention relates to a navigation and pointing system in which a navigation unit is integrally coupled to a pointing device. The navigation unit provides accurate measurements of position and orientation of the system relative to a global reference system and the pointing device provides a measurement of a parameter, for example a distance, in a pointing direction.

More particularly, the invention relates to a system that couples on a same platform an inertial navigation unit to a lidar (acronym for Light Detection and Ranging) of the two-dimensional scanning type (2D lidar) or the three-dimensional scanning type (3D lidar). More particularly, the invention relates to a method of calibration of the angular error of pointing in a navigation and pointing system, for example a 2D or 3D terrestrial lidar coupled to an inertial navigation unit.

BACKGROUND OF THE INVENTION

In its simplest design, a lidar is an optical device including a laser source, which emits a pulsed laser beam along an axis of sight, also called pointing direction, and a detection system that measures the reciprocating propagation time of the pulsed laser beam between the laser source and the target, the laser beam being reflected or backscattered by the target in the pointing direction and in the reverse direction of the incident laser beam. A lidar hence allows to measure the distance to a target.

There exist navigation and pointing systems integrating both a Lidar and a navigation unit, which indicates the geographic position and orientation of the system, to allow localising a target in space. In particular, navigation and pointing systems are known, in which a lidar is combined to an inertial navigation unit (INS, for Inertial Navigation System), as described for example in the article "*Simultaneous Calibration of ALS Systems and Alignment of Multi-view LiDAR Scans of Urban Areas*", M. Hebel and U. Stilla in IEEE Transactions on Geoscience and Remote Sensing, vol. 50, n° 8, June 2012.

The article "*Tight Coupling of Laser Scanner and Inertial Measurements for a Fully Autonomous Relative Navigation Solution*" A. Soloviev, D. Bates and F. van Graas in Navigation: Journal of the Institute of Navigation, vol. 54, n° 3, autumn 2007, aims to obtain an autonomous 2D relative positioning system.

In these navigation and pointing systems, there exist different types of lidar according to the means used to orient the pointing direction of the laser beam in space:

- a 2D Lidar combines a lidar with a one-degree-of-freedom opto-mechanical system, such as for example a mirror rotating about an axis orthogonal to the axis of sight of the laser, adapted to vary the orientation of the laser beam in a plane of space (i.e. in 2D) and acquire in return measurements along a line (for example by projection onto a plane). Herein, each thus-acquired line is called a scan line or sweep line;
- a 3D Lidar combines a Lidar with a two-degree-of-freedom opto-mechanical system, adapted to vary the orientation of the laser beam in all the directions of space (i.e. in 3D) and acquire in return measurements coming from any point in space. For example, a 3D Lidar may be consisted of a 2D Lidar mounted on a rotating table, allowing rotational movements about an axis orthogonal to that of the 2D-scan mirror.

A system integrating a 2D-lidar or a 3D-lidar with a positioning system and an orientation system is called a "scanner laser".

FIG. 1 shows an example of navigation and pointing system 10 comprising an inertial navigation unit 11 and a lidar 12 mechanically connected to each other by a rigid element 13, so that the INS and the lidar are integral with each other. The lidar 12 includes a laser source and a backscattered-beam detection system. The lidar 12 also includes a planar mirror 15 mounted mobile in rotation about an axis of rotation 16. For example, the normal to the plane of the mirror 15 is inclined at 45 degrees with respect to the direction of emission of the laser beam, which is preferably coaxial to the axis of rotation 16. By rotation 26 of the mirror 15 about the axis of rotation 16, the pointing direction 17 of the laser beam scans a plane 27, herein called scan plane. A two-dimensional lidar (2D lidar) is hence obtained, which allows to measure the distance of a target located in the scan plane 27. Knowing the pointing direction 17 in the reference system of the INS, it is then possible to provide the indications of position and orientation of the target with respect to a global reference system.

Depending on the devices, the rotation of the mirror 15 about the axis of rotation 16 may be either continuous, and always in the same direction, or oscillating, the mirror 15 performing reciprocal movements between two stops.

The navigation and pointing system 10 is for example mounted on a platform 14 rotationally mobile about an axis transverse to the axis of rotation 16 of the mirror 15. A rotation of the platform 14 causes the rotation of the whole system 10 and thus the rotation of the scan plane 27. A 3D lidar is hence obtained, which allows to measure the distance of a target in any pointing direction 17 in the three-dimensional space (3D lidar). So as to be able to geo-reference the LiDAR points, it is required to couple the lidar with other systems allowing to know the position and the orientation of the LiDAR.

The position and orientation are generally provided by a positioning system (denoted SP), such as a system combining a GPS localisation system and an inertial navigation unit {GPS+INS} or a GPS localisation system and a heading and vertical unit {GPS+AHRS}, for Attitude and Heading Reference System, or other. Hereinafter, it is meant by positioning system any system adapted to provide its position and orientation in a global reference system without making a distinction between the different possible sub-systems.

An AHRS unit (Attitude Heading Reference System) or an INS unit (Inertial Navigation System) are systems providing their orientation in a global reference system, such as the ECEF reference system. It then remains to know the relative orientation of the LiDAR with respect to the positioning and orientation system that is mechanically attached thereto.

Hereinafter, it is means by "LiDAR system" a system that combines a sighting instrument (the LiDAR), a positioning system and an orientation system. Such a lidar system hence provides measurements of position, orientation and sight.

By way of illustrative and non-limitative example, hereinafter, a system providing the orientation is illustrated by an INS.

A reference system 21 linked to the INS, hereinafter called INS reference system, is defined by a centre $O_{SNI}$ and three axes $X_{SNI}$, $Y_{SNI}$ and $Z_{SNI}$ (hereinafter, INS is referred to as SNI in the formulas and in the Figures). By convention, $X_{SNI}$ points forwards, $Y_{SNI}$ points towards the right, and $Z_{SNI}$ points downwards. The navigation unit 11 allows at each instant to determine the position and orientation of the INS reference system with respect to a geographic reference system, or global reference system, for example the ECEF (Earth centred, Earth fixed) reference system defined by a geographic centre $O_{ECEF}$ and three geographic axes $X_{ECEF}$, $Y_{ECEF}$ and $Z_{ECEF}$. The centre of the ECEF reference system is the centre of the Earth. The axes $X_{ECEF}$ and $Y_{ECEF}$ are in the equatorial plane, $X_{ECEF}$ points towards the Greenwich meridian and $Y_{ECEF}$ points towards 90 deg. East. Finally, $Z_{ECEF}$ points towards the pole. The ECEF reference system is a global reference system, its centre is fixed.

A reference system 22 proper to the pointing system, herein called lidar reference system is defined by a centre $O_{lidar}$ and three axes $X_{lidar}$, $Y_{lidar}$ and $Z_{lidar}$. The LiDAR considered herein is a 2D LiDAR. By convention, the axis $Y_{lidar}$ is the axis of rotation 16 of the mirror 15 and points towards the interface of the LiDAR that is considered as being the front of the LiDAR. Therefore, the LiDAR scans the plane ($X_{lidar}$, $Z_{lidar}$), where $X_{lidar}$ points towards the right of the LiDAR and $Z_{lidar}$ points towards the top. The plane ($X_{lidar}$, $Z_{lidar}$) is also denoted scan plane 27 of the pointing direction 17 of the laser beam.

FIG. 2 schematically shows the INS reference system 21 and the lidar reference system 22 of the system of FIG. 1, with respect to the geographic reference system 20. The distance between the centre $O_{SNI}$ of the INS reference system and the centre $O_{lidar}$ of the lidar reference system is commonly called lever arm. By construction, herein, the axis $X_{SNI}$ of the INS reference system 21 is almost parallel to the axis $Y_{lidar}$ of the lidar reference system 22, the axis $Y_{SNI}$ of the INS reference system 21 is almost parallel to the axis $X_{lidar}$ of the lidar reference system 22, and the axis $Z_{SNI}$ of the INS reference system 21 is almost parallel and opposite to the axis $Z_{lidar}$ of the lidar reference system 22. Herein, almost parallel means aligned to within ±5 deg., or even to within better than 1 degree.

A rotation matrix comprising three Euler angles is defined to switch from the INS reference system to the lidar reference system. By construction, theses rotation angles are generally known to within better than a few degrees, or even to within a few tenth of degrees.

However, given that the lidar measures distances from a few meters to several hundreds of meters, an error in the angular orientation of the pointing direction may translate into a positioning error, which is not a constant bias error but an error varying according to the distance of the target.

It is therefore necessary to define a calibration method to determine the misalignment angles between the INS reference system and the lidar reference system. Let's denote misalignment angles (boresight error) the angles corresponding to the angular errors between the estimated reference system of the INS and the reference system 21 attached to the INS.

FIG. 3 schematically shows the change of reference system to switch from the reference system 21 proper to the INS to an estimated reference system 31.

FIG. 3 illustrates the three misalignment Euler angles ($\Phi$, $\theta$, $\psi$) that are desired to be calibrated. The misalignment angle $\psi$ represents an angle of rotation about the axis $Z_{SNI}$ to switch from the reference system ($X_{SNI}$, $Y_{SNI}$) to a reference system ($X'_{SNI}$, $Y'_{SNI}$). The misalignment angle $\theta$ represents an angle of rotation about the axis $Y'_{SNI}$ to switch from the reference system ($X'_{SNI}$, $Z_{SNI}$) to a reference system ($X''_{SNI}$, $Z''_{SNI}$), the axis $Y'_{SNI}$ being merged with the axis $Y''_{SNI}$. The misalignment angle $\Phi$ represents an angle of rotation about the axis $X''_{SNI}$ to switch from the reference system ($Y''_{SNI}$, $Z''_{SNI}$) to the estimated reference system 31.

During the installation of the lidar system, the relative orientation of the two devices is known to within a few degrees. This relative orientation is expresses by the reference-system change matrix $C_{LiDAR}^{SNI}$.

The object of the calibration of the misalignment angles is to determine accurately the three misalignment Euler angles ($\Phi$, $\theta$, $\psi$) represented in FIG. 3.

This problem of calibration of the misalignment angles has already been tackled, in particular in aerial lidar (airborne lidar) applications in which a lidar system is taken on board an aircraft so as to scan or sweep the surface of the ground or of the building roofs during a displacement of the aircraft. In these applications of aerial lidar, the error on the misalignment angles is particularly critical. Indeed, the aerial lidars scan distances of several hundreds of meters. Now, the greater the pointing distance, the more the error on the position of the points measured by the lidar system is high, and thus easily observable.

The publication K. Kris Morin, Naser El-Sheimy, 2002, *"Post-mission adjustment methods of airborne laser scanning data"* In FIG. XXII International Congress, Washington, D.C. USA discloses the impact of the misalignment angle errors on the positioning of the points measured by an aerial lidar, and explains different methods of calibration. Two categories of calibration methods can be distinguished: on the one hand, the methods controlled by the data (Data-driven), and on the other hand the methods controlled by the system (System-driven).

A first data-driven calibration method consists in adjusting manually different acquisitions of lines or images by scanning the laser beam until the result is visually satisfying. This method is absolutely not mathematically rigorous and does not provide a statistical measurement about the quality of calibration.

Another data-driven calibration method is described in the publication Chao Gao, Spletzer, J. R., *"On-line calibration of multiple lidars on a mobile vehicle platform"*, Robotics and Automation (ICRA), 2010 IEEE International Conference, vol., no., pp. 279, 284, 3-7 May 2010. According to this publication, remarkable points, such as lines or contours, are identified in different images produced by the scanning (or scan) of a same zone. These remarkable points are then used to calculate the rotation matrix R and the translation vector T minimizing the deviation between these points $\hat{X}_{LiDAR}^{ecef}$. After correction, the points $X_{LiDAR}^{ecef}$ are obtained:

$$X_{LiDAR}^{ecef} = R \cdot \hat{X}_{LiDAR}^{ecef} + T$$

The data-driven methods are not based on any model and do not require collecting the position data of the GPS of the vehicle on board which the system is taken or the attitude data of the INS but only the lidar points. At first sight simple, these methods are not so in reality.

Indeed, the selection of remarkable points is not trivial because, even with a high-density acquisition of points, it is difficult to select accurately the same points in several scans, all the more since these points are noisy. This selection of points is not automatic, it takes a lot of time and the result of the calibration highly depends on the user.

Besides, as the data-driven methods are not based on a rigorous error model, they do not provide statistical measurement tools allowing to judge the quality of the adjustment.

The system-driven calibration methods are based on an error model, as disclosed, for example, in the publications Skaloud, J., Litchi, D., 2006, *"Rigorous approach to boresight self-calibration in airborne laser scanning"*, ISPRS Journal of Photogrammetry & Remote Sensing 61, 47-59 and Skaloud, J., Schaer, P., *"Towards automated lidar boresight self-calibration"*, in Proc. 5th International Symposium on Mobile Mapping Technology, Padua, Italy, 6 p, May 2007. This error model allows identifying systematic errors, including in particular the misalignment error between the lidar and the navigation unit. Therefore, a same operation of selection of remarkable points as above is performed, but the estimation of the misalignment angles requires the use of an error model.

A model of error of the following type is then used:

$$X_{LiDAR}^{ecef} = X_{SP}^{ecef} + C_n^{ecef} C_{SNI}^n (b + (C_{SNI}^{SNI} C_{LiDAR}^{SNI}) X_{LiDAR}^{LiDAR})$$

where ecef (earth centred earth fixed) denotes a geocentric and geostationary reference system;

$C_A^B$: represents generally a transition matrix from a reference system A to a reference system B;

$X_\alpha^\beta$: represents generally a position of the device $\alpha$ in the reference system $\beta$;

b: represents the lever arm between the lidar and the positioning system.

The error model may also take into account other error parameters such as the lever arm errors, the bias on the angles of the INS, the bias on the distance measurement by the lidar . . . .

However, these methods of calibration require the intervention of a user to select remarkable points in the different scans.

The publication Skaloud, J., Schaer, P., *"Towards automated lidar boresight self-calibration"*, in Proc. 5th International Symposium on Mobile Mapping Technology, Padua, Italy, 6 p, May 2007 proposes to automatize the process of calibration of an aerial lidar system, by selecting a set of points belonging to a same surface, for example a roof, instead of comparing remarkable points two by two.

This approach allows the automation of the calibration algorithm. It is indeed easier to put in place processes of automatic detection/extraction of planes and of identification of common planes between different scans. This method gives satisfying results in aerial lidar because the distance to the targets is great and thus makes the error easily observable.

In the so-called terrestrial lidar systems, a lidar system is taken on board a terrestrial vehicle, for example on the roof of a car, and the laser beam scans the fronts of the buildings during displacements of the vehicle along a street, for example.

The conventional methods of calibration of terrestrial-lidar navigation and pointing systems are very widely inspired by the aerial lidar calibration approach, which seems to give good results.

Therefore, the publication Rieger, P., Studnicka, N., Pfennigbauer, M., Zach, G., *"Boresight alignment method for mobile laser scanning systems"*, Journal of Applied Geodesy. Volume 4, Issue 1, Pages 13-21 describes the calibration of a terrestrial lidar system by dynamically scanning a plane, during a displacement of the system in one direction and in the other one, and by varying the heading angle of the lidar according to four positions. This calibration requires at the minimum a total of 8 scans, each orientation having to be repeated at least two times.

The process being performed dynamically, the points have to be expressed in a global reference system (ex: ECEF). Once the points expressed in the global reference system, an algorithm detects the common planes formed by the lidar points between the different scans and estimates the misalignment angles by adjusting these planes of the different scans relative to each other.

However, the performance of such terrestrial lidar calibration is lesser than with an aerial lidar. Firstly, the pointing distances are far smaller (of the order of 10 m), which makes the error about the position of the lidar points far less easily observable. Moreover, it is not easy to vary enough the pointing distance to bring out the misalignment error. Further, the calibration process being performed dynamically, it is necessary to use a positioning system providing the position of the vehicle in real time. Now, during the terrestrial displacements, the GPS signal may be masked or affected by multipath propagations, which is less frequent in the aerial case. On the other hand, in terrestrial lidar, the diversity of orientation of the planes is lesser: there are mainly horizontal and vertical planes, whereas in aerial lidar, the building roofs offer generally a very varied range of orientations, allowing to reduce the correlation between the different misalignment angles. Finally, this method reveals to be sensitive to the bias on the angles given by the navigation unit, so that the misalignment angle values derived from this calibration are generally biased.

To sum up, the method of calibration of the misalignment angles are sensitive to different sources of errors: human errors, during the choice of the remarkable points, GPS errors, during the displacement of the system during calibration, and INS bias errors. Moreover, these calibration methods are time consuming.

There thus exists a need for a method of calibration of the misalignment angles that is both easy and fast to implement and preferably automatic. Another object of the invention is to provide a calibration method that is immune to the GPS errors. Another object of the invention is to provide a calibration method that is robust to lever arms. Still another object of the invention is to provide a calibration method that is insensitive to the INS biases so as to determine non-biased misalignment angles.

SUMMARY OF THE INVENTION

The present invention has for object to remedy the drawbacks of the prior art methods and devices.

The invention relates in particular to a method of calibration of a navigation and pointing system comprising a navigation unit integrally connected to a pointing device, the navigation unit being configured to measure the position and the orientation of a reference system of said navigation unit, the pointing device comprising means for emitting a beam in a pointing direction and means for varying the pointing direction, the pointing device being configured to measure a pointing signal, preferably by reflection or backscattering of said beam on a target, as a function of the pointing direction in a reference system linked to the pointing device, the calibration method comprising the following steps of calibration of the angles between the reference system of said navigation unit and the reference system linked to the pointing device:

a. Estimating an approached navigation reference system, the approached navigation reference system being inclined with respect to the navigation reference system with misalignment Euler angles ($\Phi$, $\theta$, $\psi$);

b. Selecting a first planar surface, preferably vertical;

c. Determining a vector normal to said first planar surface in the navigation reference system;

d. Directing the navigation and pointing system in a plurality of distinct angular orientations with respect to the first planar surface, said plurality of angular orientations being determined in the reference system of the navigation unit;

e. Varying the pointing direction so as to acquire, by means of the pointing device, for each of the orientations of said plurality of orientations with respect to the first planar surface, a series of pointing measurements along a scan line on the first planar surface;

f. Processing each of said series of pointing measurements along a scan line on the first planar surface, so as to determine, in the reference system linked to the pointing device, an approached direction vector of each scan line on the first planar surface;

g. Processing a plurality of approached direction vectors of a plurality of scan lines on the first planar surface, to deduce therefrom an approached normal vector of the first planar surface;

h. Calculating at least one misalignment angle ($\Phi$, $\theta$, $\psi$) between the approached normal vector determined at the previous step in the approached navigation reference system and the normal vector determined a step c) in the reference system of the navigation unit.

According to a preferred embodiment, the calibration method further includes the following steps:

i. Selecting a second planar surface, preferably horizontal;

j. Determining a vector normal to said second planar surface in the navigation reference system;

k. Directing the navigation and pointing system in a plurality of distinct angular orientations with respect to the second planar surface, said plurality of angular orientations being determined in the reference system of the navigation unit;

l. Varying the pointing direction so as to acquire, by means of the pointing device, for each of the orientations of said plurality of orientations with respect to the second planar surface, a series of pointing measurements along a scan line on the to second planar surface;

m. Processing each of said series of pointing measurements along a scan line on the second planar surface so as to determine, in the reference system linked to the pointing device, an approached direction vector of each scan line on the second planar surface;

n. Processing a plurality of approached direction vectors of a plurality of scan lines on the second planar surface to deduce therefrom an approached normal vector of the second planar surface;

o. Calculating at least another misalignment angle ($\Phi$, $\theta$, $\psi$) between the approached normal vector determined at the previous step in the approached navigation reference system and the normal vector determined at step j) in the reference system of the navigation unit.

According to a particular aspect of the method of the invention, said plurality of angular orientations includes the four following angular orientations of the navigation and pointing system with respect to the first planar surface, where r denotes the roll angle, t the pitch angle and c the heading angle of the navigation and pointing system with respect to a local reference system, such that the axes X and Y of this local reference system are in the horizontal plane and the axis X is parallel to the plane of the first planar surface:

Orientation 1: (r, t, c)=(0, 0, 0±5 deg.)
Orientation 2: (r, t, c)=(0, 0, 180±5 deg.)
Orientation 3: (r, t, c)=(0, 0, 55±25 deg.)
Orientation 4: (r, t, c)=(0, 0, −55±25 deg.)

and/or the two following angular orientations of the navigation and pointing system with respect to the second planar surface:

Orientation 5: (r, t, c)=(0, 55±25 deg., 0)
Orientation 6: (r, t, c)=(0, −55±25 deg., 0).

According to a particular aspect of the method of the invention:

step e) and/or step l) includes a plurality of scans of a same scan line and said series of pointing measurements along a scan line is obtained by calculation of an average of the plurality of scans of a same scan line;

step g) and/or step n) of determining an approached normal vector includes a step of determining an eigenvector associated with the smallest eigenvalue of a main component analysis of the series of pointing measurements along said plurality of scan lines or a step of calculation of an average of a plurality of normal vectors measured by vector product of the approached direction vectors of two different scan lines determined at step f) and/or at step m).

According to a particular embodiment, step h) and/or step o) of calculation of the misalignment angles ($\Phi$, $\theta$, $\psi$) includes a step of maximisation of a scalar product to deduce therefrom an estimation of a misalignment angle, said step of maximization including a step of processing by a non-linear least squares regression method or by a linear least squares regression method or a Quasi-Newton method.

According to a particular and advantageous embodiment, the calibration method includes a step of calculation of an indicator of accuracy of the misalignment angles ($\Phi$, $\theta$, $\psi$).

The invention also relates to a navigation and pointing system comprising a navigation unit integrally connected to a pointing device, the navigation unit being configured to measure the position and the orientation of a reference system of said navigation unit, the pointing device comprising means for emitting a beam in a pointing direction and means for varying the pointing direction, the pointing device being configured to measure a pointing signal, preferably by reflection or backscattering of said beam on a target, as a function of the pointing direction in a reference system linked to the pointing device, the navigation system comprising means for processing the measurements of position and orientation of the navigation unit and means for processing the pointing signal, and calibration means adapted to implement an angular calibration between the reference system of said navigation unit and the pointing reference system following a calibration method according to one of the embodiments described.

According to particular and advantageous aspects of the navigation and pointing system:

said navigation unit includes an orientation system among an inertial navigation unit or an attitude unit of the AHRS type and/or a positioning system of the GPS type;

the pointing device includes a two-dimensional-plane scanning lidar, a three-dimensional scanning lidar, or a sonar.

Advantageously, the navigation and pointing system further includes means for angular orientation of said navigation and pointing system, adapted to direct said navigation and pointing system in a plurality of distinct angular orientations with respect to said first planar surface and/or, respectively, to said second planar surface.

The invention will find a particularly advantageous application in the navigation and pointing systems comprising an inertial unit and a lidar.

The invention also applies to other systems integrating a positioning system, an orientation system as well as a sighting system, and in particular a sighting system such as a sonar based on the emission and the reception of acoustic signals.

The present invention also relates to the characteristics that will be revealed during the following description and that will have to be considered in isolation or according to any technically possible combination thereof.

BRIEF DESCRIPTION OF THE DRAWINGS

This description, which is given only by way of non-limitative example, will permit to better understand how the invention can be implemented, in reference to the appended drawings, in which.

DETAILED DESCRIPTION OF THE INVENTION

In the description of the following embodiment, the calibration of a lidar system comprising a 2D lidar is considered. However, the invention in not in any way limited to this embodiment. The one skilled in the art will easily transpose the described method to a 3D lidar system, by limiting the scanning to 2D.

Figure 1:
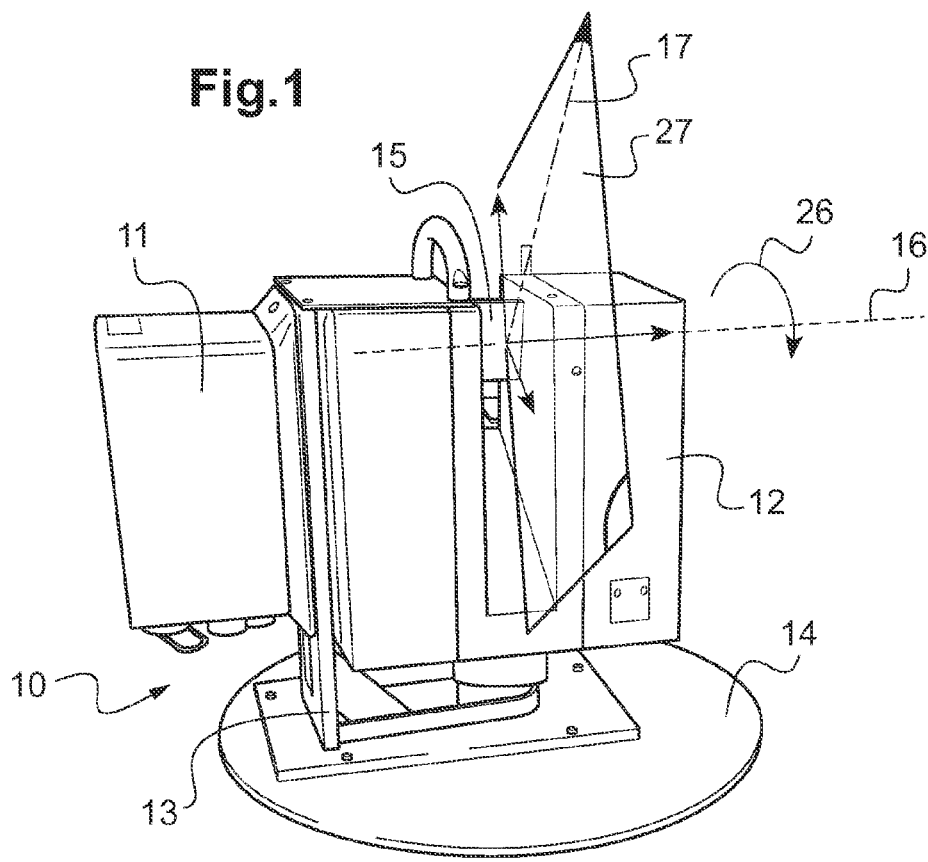
FIG. 1 shows a 2D scanning lidar system.
Figure 2:
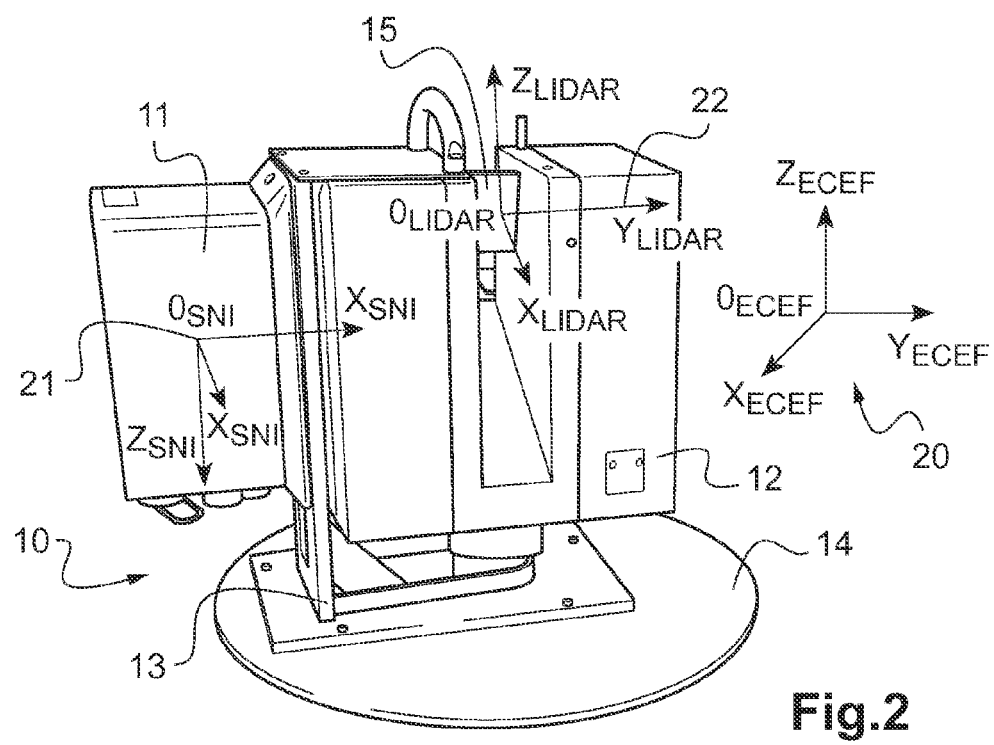
FIG. 2 shows the reference systems of the INS and of the lidar, respectively, in a lidar system.
Figure 3:
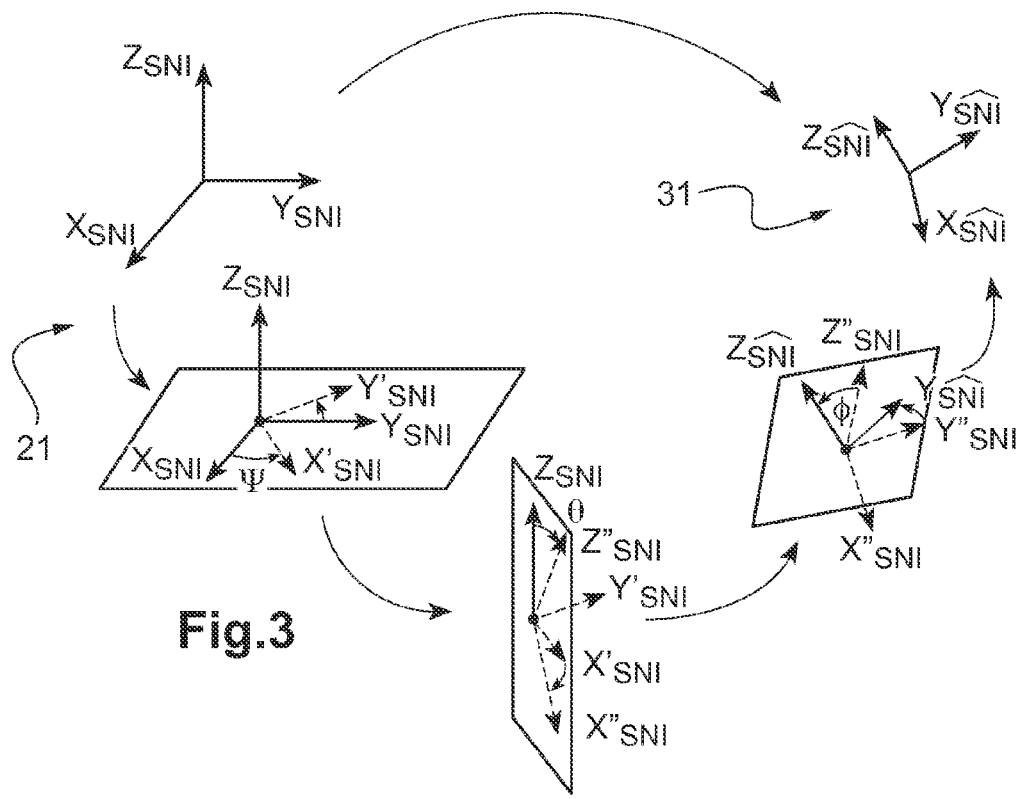
FIG. 3 schematically shows the three alignment error Euler angles that are desired to be calibrated to switch from the INS reference system (the true reference system of the INS device) to a sÑI reference system (approximated reference system)

We consider a lidar system 10 placed at a fixed position in a geographic reference system. The lidar system 10 is integrally mounted as illustrated for example in FIG. 2.

Before beginning the acquisition of data, the navigation unit 11 has to be aligned according to the instructions of the manufacturer, so as to determine accurately the angular orientation of the reference system 21 (INS) of the navigation unit 11 with respect to a geographic reference system 20 of reference, for example the ecef (earth centred earth fixed) reference system.

The calibration method comprises the angular orientation of the lidar system in a plurality of orientations with respect to a reference planar surface, wherein the lidar system can remain static, i.e. in a same position in space with respect to the geographic reference system, because the position of the system has no impact on the calibration, only the angular orientation of the lidar system with respect to the reference planar surface (for example, a wall as explained hereinafter) counts. It is to be clear that it is herein the orientation of the lidar system that is considered, the INS being integral with the lidar. The different orientations of the lidar system are described in detail hereinafter.

The calibration method comprises the acquisition of lidar measurements along a scan line or sweep line, for each of the orientations of the lidar system with respect to the reference planar surface.

The calibration method then comprises the processing of the different scans acquired for the different orientations of the lidar system with respect to the reference planar surface, to extract therefrom a measurement of one or several misalignment Euler angles.

The orientation of the lidar system 10 with respect to a first reference planar surface is defined using three Euler angles: (r, t, c). These angles are respectively the roll, pitch and heading angles of the INS defined with respect to a local reference system of the site of calibration.

More precisely, by way of illustrative example, a wall 8 supposed to be planar and vertical in the geographic reference system is chosen as the first reference planar surface.

The lidar reference system $(X_{lidar}, Y_{lidar}, Z_{lidar})$ has been represented in FIGS. 4-8. Hereinafter, the rotation axis of the laser beam scanning is supposed to be the axis $Y_{lidar}$. A reference system $(X_{mur}, Y_{mur}, Z_{mur})$ linked to the wall (referred to as "mur" in the formulas and the figures) has also been represented in FIGS. 4-6. The wall reference system is proper to each scan because it depends on the orientation of the scan. The axis $X_{mur}$ corresponds to the normal to the wall, the axes $Y_{mur}$ and $Z_{mur}$ are hence in the plane of the wall, with $Z_{mur}$ collinear to the direction of the scan (see FIGS. 4-6). The wall reference system applies to the scans of any planar surface, whether it is a vertical wall (FIGS. 4-6 and 8) or a horizontal ground (FIG. 9).

Figure 4:
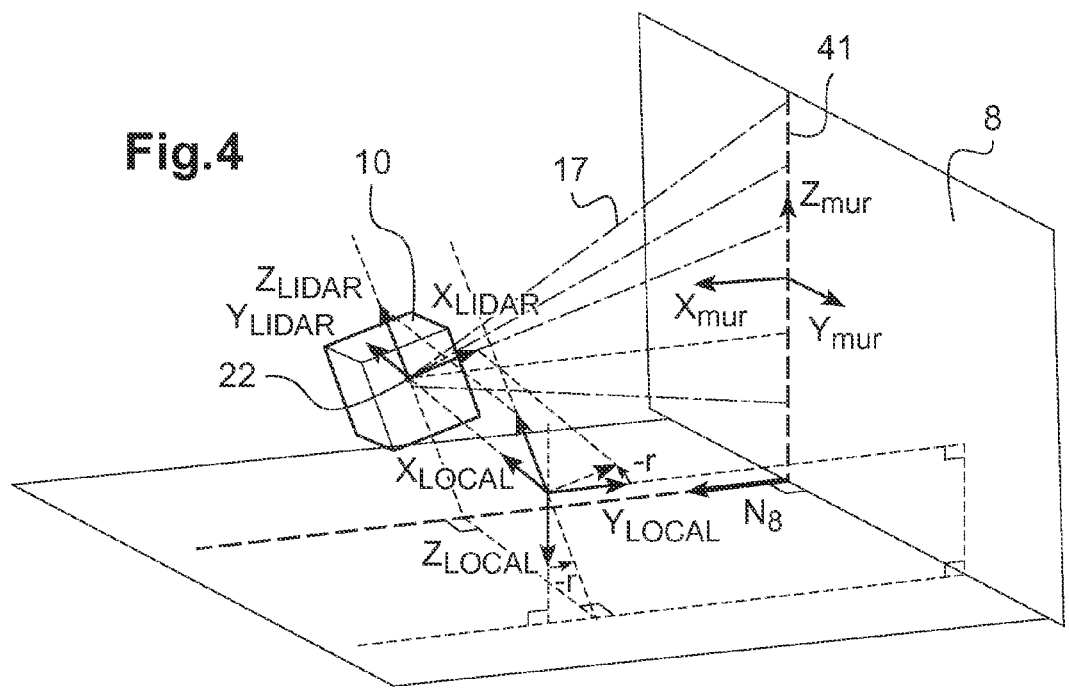
FIG. 4 illustrates the roll angle r of a lidar system in a first orientation of calibration in front of a reference wall.
Figure 5:
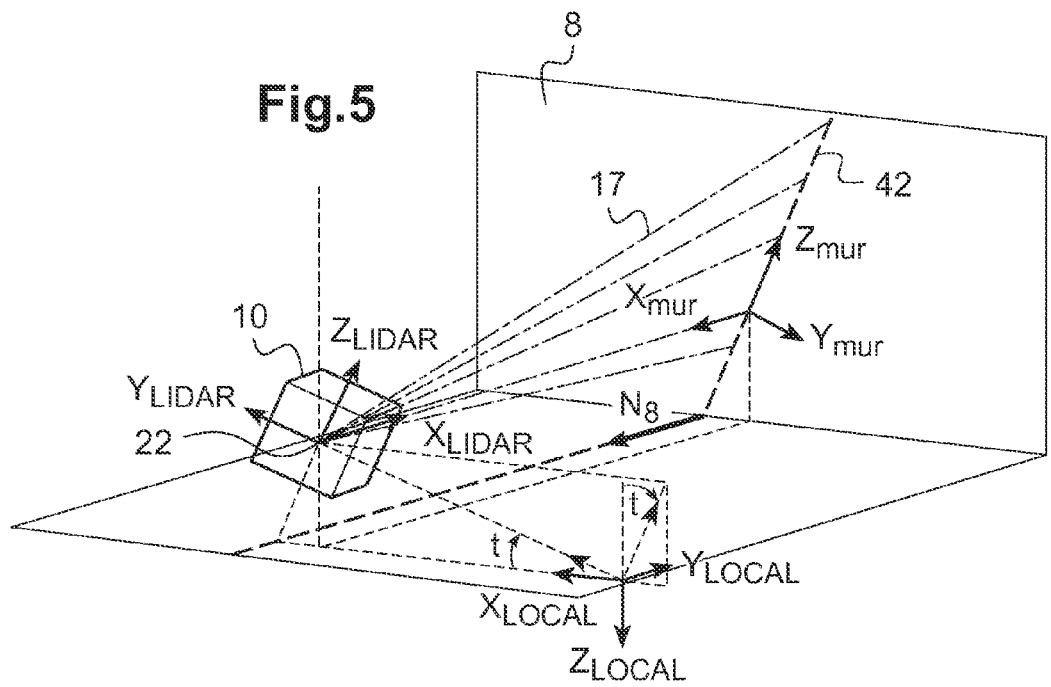
FIG. 5 illustrates the pitch angle t of a lidar system in a second orientation of calibration in front of a reference wall.
Figure 6:
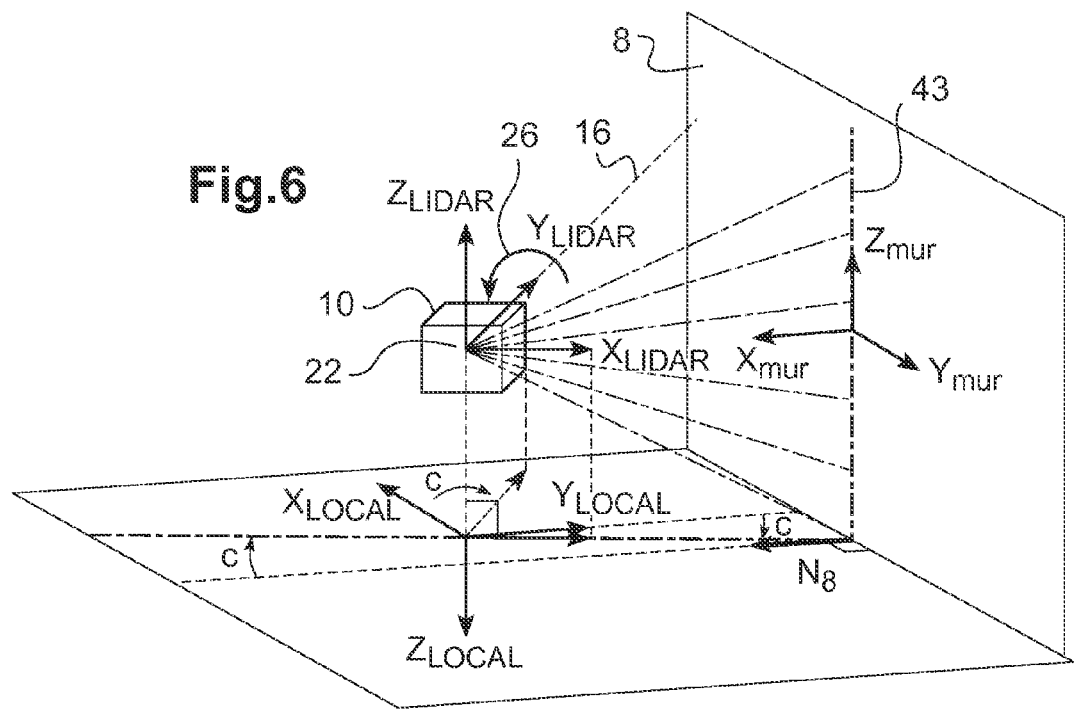
FIG. 6 illustrates the heading angle c of a lidar system in another orientation in front of a reference wall.

A local reference system of the site of calibration has been represented in FIGS. 4-6. This local reference system is defined for practical reasons so as to explain clearly the angles used for the calibration process. The local reference system is only used to express orientations, the position of its origin has no importance, only the direction of the three axes is important. This local reference system corresponds to a navigation reference system, to within a rotation about Z. Hence, $X_{local}$ and $Y_{local}$ are in the local tangent plane with $Y_{local}$ pointing towards the wall and $X_{local}$ towards the left of the wall. $Z_{local}$ is merged with the local vertical and points downwards.

FIG. 4 schematically illustrates the roll angle r of the lidar system with respect to a planar and vertical wall 8. The pointing direction 17 of the laser beam of the lidar is schematically represented by several dashed lines corresponding to different angular orientations of the mirror 5 about the axis $Y_{lidar}$ to produce a scanning by the laser beam. By projection onto the wall 8, the laser moves along a scan line or sweep line 41. When the lidar has an orientation such as illustrated in FIG. 4, with only a non-null roll angle r with respect to a local vertical (for example, a straight line perpendicular to the ground), the pitch angle t and heading angle c being null, the scan line 41 is a vertical line that is located in the plane of the wall 8. In this case, the heading angle c being null, the plane of incidence of the laser beam, formed by the pointing directions 17, is normal to the plane of the wall 8.

FIG. 5 schematically illustrates the pitch angle t of the lidar system with respect to the planar and vertical wall 8. Similarly to FIG. 4, the pointing direction 17 of the laser beam of the lidar is schematically shown by several dashed lines corresponding to different angular orientations of the mirror 5 about the axis $Y_{lidar}$ to produce a scan by the laser beam. By projection onto the wall 8, the laser beam follows a scan line or sweep line 42. When the lidar has an orientation such as illustrated in FIG. 5, with only a non-null pitch angle t, the roll angle r and the heading angle c being null, the scan line 42 is a line that is located in the vertical plane of the wall 8 but that is inclined by the angle t with respect to the vertical. In this case, the heading angle c being null, the plane of incidence of the laser beam, formed by the pointing directions 17, is normal to the plane of the vertical wall 8.

FIG. 6 schematically illustrates the heading angle c of a lidar system with respect to the planar and vertical wall 8. Similarly to FIGS. 4-5, the pointing direction 17 of the laser beam of the lidar is schematically shown by a dashed line corresponding to different angular orientations of the mirror 5 about the axis $Y_{lidar}$ to produce a scan by the laser beam. By projection onto the wall 8, the laser beam follows a scan line or sweep line 43. When the lidar has an orientation such as illustrated in FIG. 6, with only a non-null heading angle c, the roll angle r and the pitch angle t being null, the scan line 43 is a vertical line that is located in the plane of the wall 8. In this case, the plane of incidence of the laser beam, formed by the pointing directions 17, is inclined by the angle c with respect to the normal $N_8$ to the plane of the vertical wall 8.

Figure 7:
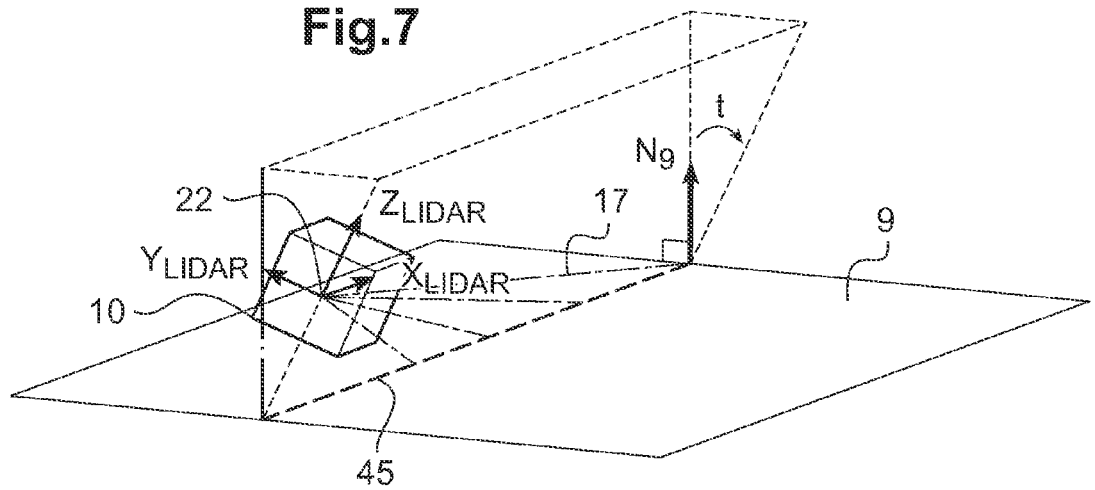
FIG. 7 illustrates the orientation of a lidar system in an orientation of calibration with respect to a reference ground.

FIG. 7 schematically illustrates the pitch angle t of the lidar system during a scan of the horizontal plane 9. The pointing direction 17 of the laser beam of the lidar is schematically shown by a dashed line corresponding to different angular orientations of the mirror 5 about the axis $Y_{lidar}$ to produce a scan by the laser beam. By projection onto the ground 9, the laser beam follows a scan line or sweep line 45. When the lidar has an orientation such as illustrated in FIG. 7, with only a non-null pitch angle t, the roll angle r and the heading angle c being null, the scan line 45 is a line that is located in the horizontal plane of the ground 9 and that is thus horizontal. In this case, the plane of incidence of the laser beam, formed by the pointing directions 17, is inclined by the angle ($\pi/2-t$) with respect to the normal to the plane of the horizontal ground 9.

Figure 8:
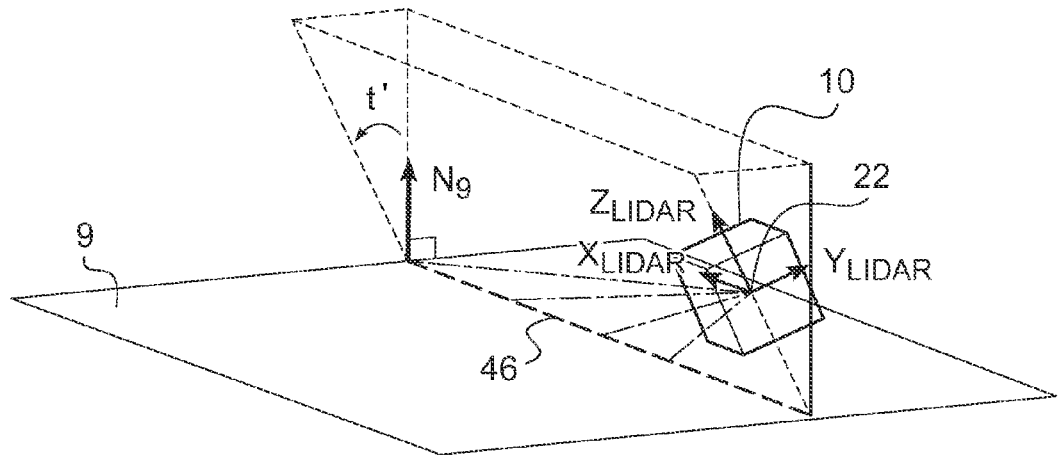
FIG. 8 illustrates the orientation of a lidar system in another orientation of calibration with respect to a reference ground.
Figure 9:
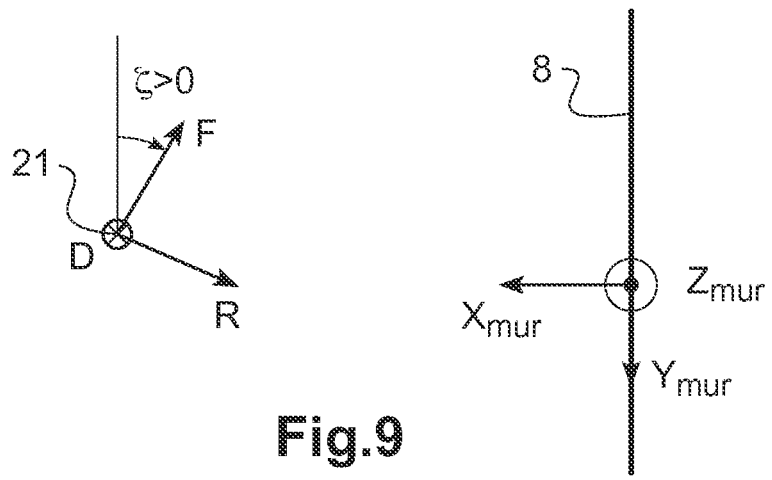
FIG. 9 is a top view for illustrating the orientation of a lidar system for the calibration with respect to a reference wall.

Similarly, FIG. 8 schematically illustrates another pitch angle t' of the lidar system during a scan on the horizontal plane 9. By projection onto the ground 9, the laser beam follows a scan line or sweep line 46. When the lidar has an orientation such as illustrated in FIG. 7, with only a non-null pitch angle t', the roll angle r and the heading angle c being null, the scan line 46 is a line that is located in the horizontal plane of the ground 9 and that is thus horizontal. In this case, the plane of incidence of the laser beam, formed by the pointing directions 17, is inclined by the angle ($\pi/2-t'$) with respect to the normal to the plane of the horizontal ground.

The method of the invention uses the different angular orientations of the lidar system represented in FIGS. 4 to 8, the position of the Lidar system being moreover static, to deduce therefrom an accurate measurement of the angles between the lidar reference system 22 and the INS reference system 21 or more precisely an accurate measurement of the misalignment angles between the estimated INS reference system 31 and the real INS reference system 21.

In a simple exemplary embodiment, the method comprises the following steps:
  selecting a first planar surface, preferably vertical, for example a reference wall;
  acquiring measurements by means of the lidar system by directing the pointing direction towards the reference wall according to a predetermined series of orientations of the lidar system;
  applying an algorithm for processing the measurements acquired at the previous step to extract therefrom values of two misalignment angles.

Advantageously, the method is supplemented by the following steps:
  selecting a second planar surface, preferably horizontal, for example a reference ground;
  acquiring measurements by means of the lidar-INS system by directing the pointing direction toward the reference ground according to a predetermined series of orientations of the lidar system;
  applying an algorithm for processing the measurements acquired at the previous step to extract therefrom values of a third misalignment angle.

More precisely, in a particular embodiment, the method includes a first and a second main steps.

The first step consist in acquiring several successive scan lines, so that the lidar is directed with respect to a vertical wall 8 according to the orientations defined by the following angles in a fixed local reference system defined with respect to the wall, where the axes $X_{local}$ and $Y_{local}$ are in the plane of the ground, the axis $X_{local}$ being parallel to the wall, the axis $Y_{local}$ perpendicular to the wall and the axis $Z_{local}$ perpendicular to the ground:
  Orientation 1: (r, t, c)=(0, 0, 0)
  Orientation 2: (r, t, c)=(0, 0, 180 deg.)
  Orientation 3: (r, t, c)=(0, 0, 70 deg.)
  Orientation 4: (r, t, c)=(0, 0, −70 deg.)

The switch from orientation 1 to orientation 2 consists for example in using a double-face mirror 15, with planar and parallel faces, and applying half a turn to the lidar system.

The second step consists in scanning a horizontal plane 9, typically the ground, by tilting the lidar system in the plane formed by the vectors $Y_{lidar}$ and $Z_{lidar}$ according to the orientations defined by the following angles:
  Orientation 5: (r, t, c)=(0, 70 deg., 0)
  Orientation 6: (r, t, c)=(0, −70 deg., 0).

In each of the above-defined orientations 1, 2, 3, 4, 5, 6, the lidar system acquires at least one scan line. Advantageously, the acquisition of two scans or more per orientation allows to calculate an average scan for each orientation. For each point of a scan line, the lidar system acquires a measurement of position and angular orientation of the INS associated to a measurement of distance between the lidar and the wall 8 or the ground 9, respectively.

It is observed that the orientations 1 and 2 do not need to be accurate. An angular accuracy of about ±5 deg. is sufficient for each of the angles (r, t, c).

On the other hand, in the orientations 3 to 6, it is recommended to have pitch angle t and heading angle c higher than 60 degrees in absolute value. However, it is observed that an absolute value of pitch angle higher than 30 degrees for the orientations 5 and 6 is sufficient for the determination of the misalignment angles detailed hereinafter.

It will be seen that a minimum of 9 observations is necessary to estimate the misalignment angles ($\Phi$, $\theta$, $\psi$). Consequently, measurements according to these 6 orientations are performed at least twice.

The movements for directing the INS-lidar navigation and pointing system with respect to the wall (or with respect to the ground) may be performed manually, for example by placing the lidar system in a cage that can be inclined or by placing the lidar system on a table allowing rotational movements. As an alternative, the inclination or rotation movements are motorized. Possibly, it is also possible to take the lidar system on board a vehicle (on the roof of an automobile, for example), in which case, the vehicle moves on inclined planes to perform the tests in the different orientations of the lidar system with respect to a vertical plane and a horizontal plane.

It is not necessary to use only one reference wall 8 to make the acquisitions required for the calibration. However, the longer the acquisitions, the more the errors of orientation of the inertial unit may have an impact, due to the drift of an inertial unit over time. If the navigation unit is powered-off and powered-on again, the biases of the navigation unit may also affect the results of the measurements because the biases will have changed.

The above-defined series of orientations 1, 2, 3, 4, 5 and 6 is only an illustrative and non-limitative example. The one skilled in the art determines other series of orientations also useful to determine the misalignment angles. The sensitivity and the accuracy of measurement of the three misalignment angles depend on the selection of the different orientations. In this respect, an important point in the selection of the different orientations is to perform inclinations according to the different axes for the different orientations chosen, so as to be sensitive to the different misalignment angles. And the more the orientations are different from each other, in other words the more the amplitude of the movements is great to switch from one orientation to the other, and the more the result of the calibration will be accurate.

Measurement Processing Algorithm

The measurement processing algorithm must calculate the misalignment angles between the INS and the LiDAR ($\Phi$, $\theta$, $\psi$). An algorithm supporting the non-linearity is recommended because there is no linear relation linking the observations to the misalignment angles.

Observation Equation

The observation equation must first be defined. For each static scan of a plane, there is a set of points forming a scan line. Each of these lines, characterized by its direction vector $u_i^n$, belongs to this same plane and thus fulfils the equation:

$$f_i = (u_i^n)^T \cdot N_n = 0$$

$$f_i = (C_{SNI}^n C_{S\tilde{N}I}^{SNI}(\phi,\theta,\psi) C_{lidar}^{S\tilde{N}I} u_i^{lidar})^T \cdot N^n$$

$N^n$: normal to the plane 8 or to the plane 9 according to the plane to which belongs $u_i^{lidar}$ in the reference system [n]

$u_i^{lidar}$: direction of the scan line i in the reference system [lidar]

$C_{lidar}^{S\tilde{N}I}$: Approximated transition matrix from the reference system [lidar] to the INS reference system [SNI]

$C_{S\tilde{N}I}^{SNI}$: Matrix correcting the misalignment ($\Phi$, $\theta$, $\psi$) between the lidar and the INS $C_{SNI}^n$: Transition matrix from the INS reference system [SNI] to the reference system of [n].

As mentioned above, the observation equation does not involve position information, nor lever arm, but only orientation information. It is hence immune to the GPS errors. Besides, the fact to work in the navigation reference system and not in a global reference system makes the algorithm insensitive to the bias of the INS because the bias errors are then not projected when switching between reference systems.

In this equation, the parameters to be estimated are the misalignment angles ($\Phi$, $\theta$, $\psi$) and the normal $N^n$, which is not known a priori.

The observation equation not being a linear function of ($\Phi$, $\theta$, $\psi$), it is recommended to choose an adapted algorithm. A nonlinear least squares algorithm is presented hereinafter.

Data Shaping

The directions of the scan line are not directly provided by the LiDAR system. They must be calculated.

For Each Scan Line, Calculation of the Direction of the Scan Line

For each scan line 41, 42, 43, 45, 46, respectively, acquired in the different orientations 1 to 6 indicated above, it is searched to determine the respective direction of the scan line 41, 42, 43, 45, 46.

This calculation may be performed by means of different methods, for example determination of the eigenvector associated to the greatest eigenvalue coming from a main component analysis on all the points of each scan line, or by linear regression, etc.

Let's denote $u_i^{lidar}$ the direction vector of a scan line i expressed in the LiDAR reference system, i.e. the direction vector that is searched and $\hat{u}_i^{lidar}$ the approximation that is made thereof, i.e. the result of the calculation performed from measurements of position of the points of a scan line.

Based on the four orientations 1, 2, 3 and 4 indicated above, four scan lines 41, 42, 43, respectively, are hence measured. Based on the four scan lines 41, 42, 43, four approached direction vectors, respectively $\hat{u}_1^{lidar}$, $\hat{u}_2^{lidar}$, $\hat{u}_3^{lidar}$ and $\hat{u}_4^{lidar}$, are thus calculated, which are in principle all in the same plane of the vertical wall 8.

Based on the two orientations 5 and 6 indicated above, two scan lines 45 and 46, respectively, are measured. Based on these two scan lines 45 and 46, two approached direction vectors, $\hat{u}_5^{lidar}$ and $\hat{u}_6^{lidar}$ respectively, are calculated, which are in principle both in the plane of the horizontal ground 9.

Calculation of the Transition Matrices $C_{lidar}^{S\tilde{N}I}$ and $C_{SNI}^n$:

The relative orientation between the lidar and the INS is known approximately to within a few degrees or even to within a few tenths of degrees. This approximation is used to calculate $C_{lidar}^{S\tilde{N}I}$.

The transition matrix from the INS reference system to the navigation reference system is calculated from the angles provided by the INS.

Application of the Nonlinear Least Squares Algorithm

The nonlinear least squares algorithm is an iterative algorithm. That is to say that the state vector containing the parameters to be estimated is updated following the formula:

$$X_{k+1} = X_k + \Delta X$$

The state vector at the iteration (k) being $X_{(k)} = [\phi_{(k)} \theta_{(k)} \psi_{(k)} N8^n_{(k)} N9^n_{(k)}]^T$ with $\Delta X = (J_{(k)}^T J_{(k)})^{-1} J_{(k)}^T (-F_{(k)})$ where $F_{(k)}$ is the vector containing the N observations at the iteration (k):

$$F_{(k)} = \begin{bmatrix} f_{1(k)} \\ \vdots \\ f_{N(k)} \end{bmatrix}_{N \times 1}$$

and $J_{(k)}$ is the Jacobian of F calculated at $X_k$

The algorithm ends when the convergence criterion is reached, i.e. when $\|\Delta X\| < \epsilon$, with $\epsilon$ a predetermined threshold.

This algorithm however requires an initialization of the state vector. The three misalignment angles ($\Phi$, $\theta$, $\psi$) may be initialized with no problem to 0°. On the other hand, approximated values of the normals have to be calculated.

Initialisation of the Normals:

Based on the different scan lines 41, 42, 43, or respectively 45, 46, relative to a same plane, the wall 8 or respectively the ground 9, it is searched to determine the vector normal to this plane. More precisely, an approached normal vector relative to each of the two planes, the wall 8 and the ground 9, is calculated.

$N^n$ denotes the vector normal to the plane, i.e. the direction vector that is searched and $\hat{N}^n$ the approximation that is made following the calculation based on the measurements of the different scan lines.

More precisely, the normal $N_8$ to the vertical wall 8 has been represented in FIGS. 4-6 and the normal $N_9$ to the ground 9 has been represented in FIGS. 7 & 8.

The calculation of the approached normal vector $\hat{N}^n$ of a plane may be performed by means of different algorithms known by the one skilled in the art. For example, the eigenvector associated to the smallest eigenvalue of the main component analysis of all the points of all the scan lines relative to a same plane, expressed in the navigation reference system, is determined, or an average of all the measured normal vectors is calculated by a vector product of the previously calculated approached direction vectors, expressed in the navigation reference system. Indeed, if two direction vectors $\hat{u}_i^n$ and $\hat{u}_j^n$ belong to a same plane and are not collinear, then $\hat{u}_i^n \times \hat{u}_j^n = N^n$.

Other algorithms available to the one skilled in the art may be used to estimate the misalignment angles ($\Phi$, $\theta$, $\psi$), such as methods based on Quasi-Newton methods.

Detailed Description of an Embodiment of the Calibration Method

It is herein desired to determine favourable orientations of the lidar system during the acquisition of the different scan lines used for the calibration.

For a scan i, we have:

$$\hat{u}_i^n = u_i^n + \tilde{u}_i^n$$

where:
- $u_i^n$: represents the "true" direction vector
- $\hat{u}_i^n$: represents an estimated direction vector
- $\tilde{u}_i^n$: represents the error on the direction vector, which is in practice mainly due to the misalignment angles between the approximated INS reference system and the reference system peculiar to the INS, because the specific errors of the lidar may be considered has having a null average.

For the calibration of the misalignment angles, it is searched to maximize the error $\langle \tilde{u}_i^n, N^n \rangle$:

$$\langle \tilde{u}_i^n, N^n \rangle = \langle \hat{u}_i^n - u_i^n, N^n \rangle = \langle \hat{u}_i^n, N^n \rangle$$

where the operator $\langle .,. \rangle$ represents the scalar product of two terms.

This error hence depends on the normal to the plane N and on the direction vector u, i.e. the orientation of the lidar with respect to this plane. The lidar 12 and the navigation unit 11 being integral with each other, it can be said that the error depends on the orientation of the navigation unit 11 with respect to the plane.

Let's then define a reference system linked to the wall 8: ($X_{mur}$, $Y_{mur}$, $Z_{mur}$) and represented in FIGS. 4, 5, 6 and 9. The axis $X_{mur}$ corresponds with the normal Ng to the wall plane and points towards the lidar 12, the axis $Z_{mur}$ is merged with the direction vector u of a scan line, and finally the axis $Y_{mur}$ is defined so as to create a direct orthonormalized reference system ($X_{mur}$, $Y_{mur}$, $Z_{mur}$). The axis $X_{mur}$ is thus fixed, whereas the axes $Y_{mur}$, $Z_{mur}$ depends on the orientation of the scan. Hence:

$$u^{LiDAR} \leftrightarrow \begin{bmatrix} 0 \\ 0 \\ 1 \end{bmatrix}^{mur} \text{ and } N^{LiDAR} \leftrightarrow \begin{bmatrix} 1 \\ 0 \\ 0 \end{bmatrix}^{mur}$$

Let's now define a transition matrix from the reference system ($X_{mur}$, $Y_{mur}$, $Z_{mur}$) to the approximated reference system [$S\tilde{N}I$] of the navigation unit 11, the transition matrix being defined by three Euler angles ($\alpha$, $\beta$, $\gamma$), such that:

$$C_{mur}^{S\tilde{N}I} = \begin{bmatrix} \cos(\beta)\cos(\gamma) & -\cos(\alpha)\sin(\gamma) + \sin(\alpha)\sin(\beta)\cos(\gamma) & \sin(\alpha)\sin(\gamma) + \cos(\alpha)\sin(\beta)\cos(\gamma) \\ \cos(\beta)\sin(\gamma) & \cos(\alpha)\cos(\gamma) + \sin(\alpha)\sin(\beta)\sin(\gamma) & -\sin(\alpha)\cos(\gamma) + \cos(\alpha)\sin(\beta)\sin(\gamma) \\ -\sin(\beta) & \sin(\alpha)\cos(\beta) & \cos(\alpha)\cos(\beta) \end{bmatrix}$$

Let's rewrite the terms of the error equation as a function of this reference-system change matrix:

Let's denote: $C_{S\tilde{N}I_i}^n = C_{S\tilde{N}I}^n(\hat{\phi}_i, \hat{\theta}_i, \hat{\psi}_i)$ where the angles ($\hat{\phi}_i, \hat{\theta}_i, \hat{\psi}_i$) are the angles measured by the unit. These angles are not to be mixed up with the misalignment angles ($\phi$, $\theta$, $\psi$).

$$\hat{u}_i^n = C_{S\tilde{N}I_i}^n R_{boresight}(0,0,0) C_{lidar}^{S\tilde{N}I} u_i^{lidar} = C_{S\tilde{N}I_i}^n C_{mur}^{S\tilde{N}I} \begin{bmatrix} 0 \\ 0 \\ 1 \end{bmatrix}^{mur}$$

$$N^n = C_{S\tilde{N}I_i}^n R_{boresight}(\varphi, \theta, \psi) C_{mur}^{S\tilde{N}I} \begin{bmatrix} 1 \\ 0 \\ 0 \end{bmatrix}^{mur}$$

Let's replace these terms in the equation $\langle \tilde{u}_i^n, N^n \rangle$ so as to find the orientations to for which $\hat{u}_i^n$ does not remain perpendicular to the normal vector, otherwise the error is not visible:

$$\langle \tilde{u}_i^n, N^n \rangle = \left\langle C_{S\tilde{N}I_i}^n C_{mur}^{S\tilde{N}I} \begin{bmatrix} 0 \\ 0 \\ 1 \end{bmatrix}^{mur}, C_{S\tilde{N}I_i}^n R_{boresight}(\varphi, \theta, \psi) C_{mur}^{S\tilde{N}I} \begin{bmatrix} 1 \\ 0 \\ 0 \end{bmatrix}^{mur} \right\rangle$$

$$\langle \tilde{u}_i^n, N^n \rangle = [0 \; 0 \; 1] C_{S\tilde{N}I}^{mur} C_n^{S\tilde{N}I_i} R_{boresight}(\varphi, \theta, \psi) C_{mur}^{S\tilde{N}I} \begin{bmatrix} 1 \\ 0 \\ 0 \end{bmatrix}^{mur}$$

The expression may then be simplified:

$$\langle \tilde{u}_i^n, N^n \rangle = ([0 \; 0 \; 1] C_{S\tilde{N}I}^{mur}) R_{boresight}(\varphi, \theta, \psi) \left( C_{mur}^{S\tilde{N}I} \begin{bmatrix} 1 \\ 0 \\ 0 \end{bmatrix}^{mur} \right)$$

where $C_{mur}^{S\tilde{N}I} \begin{bmatrix} 1 \\ 0 \\ 0 \end{bmatrix} = C_1$ represents the first column of the matrix $C_{mur}^{S\tilde{N}I}$ and [0 0 1]$C_{S\tilde{N}I}^{mur}$=$C_3^T$ represents the transpose of the third column of $C_{mur}^{S\tilde{N}I}$ In the case where the misalignment Euler angles ($\phi,\theta,\psi$) are small, the following approximation may be made:

$$R_{boresight}(\phi, \theta, \psi) = I + \begin{pmatrix} 0 & -\psi & \theta \\ \psi & 0 & -\phi \\ -\theta & \phi & 0 \end{pmatrix} = I + (\Omega \times), \text{avec} \Omega = \begin{bmatrix} \phi \\ \theta \\ \psi \end{bmatrix}$$

The equation thus becomes:

$$\langle \tilde{u}_i^n, N^n \rangle = C_3^T(I+(\Omega\times))C_1$$

$$\langle \tilde{u}_i^n, N^n \rangle_{C_3^T C_1 + C_3^T(\Omega\times)C_1}$$

The columns of the reference-system change matrices are orthogonal, hence the scalar product thereof are null.

$$\langle \tilde{u}_i^n, N^n \rangle = \Omega^T(C_1 \times C_3)$$

$$\langle \tilde{u}_i^n, N^n \rangle = -\Omega^T C_2$$

By developing $C_2$, a formula representing the error as a function of the 3 misalignment angles is obtained:

$$\langle \tilde{u}_i^n, N^n \rangle = \phi(\cos(\alpha)\sin(\gamma) - \sin(\alpha)\sin(\beta)\cos(\gamma)) +$$
$$\theta(-\cos(\alpha)\cos(\gamma) - \sin(\alpha)\sin(\beta)\sin(\gamma)) + \psi(-\sin(\alpha)\cos(\beta))$$

Let's apply this formula in the two concrete cases mentioned above:
sweeping or scanning of a vertical plane 8
sweeping or scanning of a horizontal plane 9.

Figure 10:
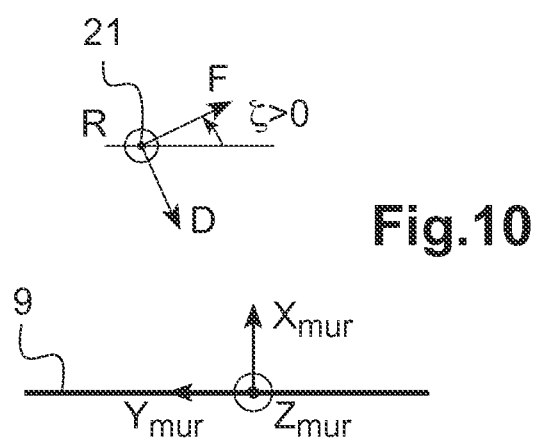
FIG. 10 is a side view to illustrate the orientation of a lidar system for the calibration with respect to a reference ground.

In FIGS. 9 and 10 are shown the reference system 21 of the navigation unit INS, and the reference system of a wall taken as the vertical plane in FIG. 9 and of the ground taken as the horizontal plane in FIG. 10. In the following, the relative orientation between the INS and the lidar corresponds to that represented in FIG. 2. More precisely, FIG. 9 represents a top view of the INS reference system and of the wall reference system during a scanning of the wall 8. FIG. 10 shows a side view of the INS reference system and of the ground reference system during a scanning of the ground 9.

For the scan on a vertical plane 8 (cf. FIG. 9), only variations of the heading angle are used. The angle $\xi$ is an oriented angle defined with respect to the parallel to the wall in a horizontal plane. It corresponds to the heading angle c defined hereinabove.

In this case, the values of the angles of the transition matrix $C_{mur}^{S\tilde{N}I}(\alpha, \beta, \gamma)$ give:

$$\begin{cases} \alpha = \pi/2 - \xi \\ \beta = \pi \\ \gamma = 0 \end{cases}$$

$$\langle \tilde{u}_i^n, N^n \rangle = \varphi(\sin(\pi/2 - \xi)) + \theta(-\cos(\pi/2 - \xi))$$

$$\langle \tilde{u}_i^n, N^n \rangle = \varphi(\cos\xi) + \theta(-\sin\xi)$$

It is observed that the heading error $\psi$ does not appear in the above expression. The heading error is hence not measurable using the scalar product with the normal. Other orientations are then required to estimate the heading error. It is also deduced therefrom that the roll and pitch errors can be estimated independently of the heading error.

The orientations favourable to the estimation of the roll error are those corresponding to an INS parallel to the wall, the LiDAR plane 27 being perpendicular to the wall. Indeed, in this case, $\xi$=0 deg. and $\langle \tilde{u}_i^n, N^n \rangle \approx \phi(\cos \xi)$. With angles close to 0 or 180 deg., it can even be considered that the roll error can be estimated independently of the heading and pitch errors.

The orientations favourable to the estimation of the pitch error are those for which the INS is almost perpendicular to the wall, the Lidar plane 27 and the wall being almost parallel to each other, this means that the wall is scanned in a very grazing manner, at angles close to 90 or −90 deg. In practice, it is difficult to have angles higher than 70 deg. Hence, this angle cannot be estimated independently of the roll error.

As a conclusion, in the case of the vertical wall 8 scanning:
the heading error cannot be estimated on a vertical plane if the lidar system has no roll/pitch;
the roll error is estimated by scanning the wall when the lidar system is parallel to the latter;
the pitch error is estimated by scanning the wall when the lidar system has an orientation that is the more grazing possible with respect to the wall.

To obtain the heading error, another surface is scanned, for example a horizontal surface 9 on the ground, as illustrated in FIG. 10.

In the scan of the horizontal plane 9, only variations of the pitch angle are used. Indeed, varying the roll and heading angles is useless in this INS-lidar configuration, because it would not vary the angles ($\alpha,\beta,\gamma$)

In FIG. 10, the angle $\xi$ is an oriented angle defined with respect to the ground. It corresponds to the angle t defined hereinabove (see FIG. 7).

In this case, the values of the angles of the transition matrix $C_{mur}^{S\tilde{N}I}(\alpha,\beta,\gamma)$ give:

$$\begin{cases} \alpha = 2 \\ \beta = \pi/2 - \xi \\ \gamma = -\pi/2 \end{cases}$$

$$\langle \tilde{u}_i^n, N^n \rangle = \varphi(\sin(\pi/2 - \xi)) + \psi(\cos(\pi/2 - \xi))$$

$$\langle \tilde{u}_i^n, N^n \rangle = \varphi(\cos\xi) + \psi(\sin\xi)$$

As a conclusion, during the scan in a horizontal plane:
the pitch error does not appear in the expression, it is hence not visible by scanning a horizontal plane;
the orientations favourable to the estimation of the roll error are those which correspond to a lidar system flat on the wall. Indeed, in this case $\xi$=0 deg. and $\langle \tilde{u}_i^n, N^n \rangle \approx \phi(\cos \xi)$.

the orientations favourable to the estimation of the cap error are those for which the lidar system has an angle $\xi$ close to ±π/2 with respect to the ground.

Consequently, the pitch error cannot be estimated on a horizontal plane, by the heading error can be estimated by scanning the ground with a sufficiently high angle |$\xi$|.

As a conclusion, the calibration method is based on the scan of two planar surfaces, preferably a vertical wall and a horizontal ground, in different orientations of the Lidar system. The position of the lidar system is preferably static between the different orientations, only the inclination of the system can vary. This calibration method allows to determine the alignment errors by a relatively simple process consisting for example in scanning the wall, the lidar system being parallel to the wall, i.e. the LiDAR plane 27 being perpendicular to the wall and the roll angle being null (cf. FIG. 9 for ξ=0), then scanning the wall with a high incidence to estimate the roll misalignment angle Φ and the pitch misalignment angle θ.

Finally, the estimation of the heading misalignment angle ψ is performed thanks to measurements acquired on a horizontal plane with an important pitch angle of the lidar system (cf. FIGS. 7-8) so as to decorrelate at the maximum the roll error and the heading error and to bring out at the maximum the heading error.

With respect to the solutions generally used for the INS-lidar calibration, the invention has in particular the following advantages.

The calibration method is insensitive to human errors. The user has not to mark remarkable points in images, there is hence no risk of error in the choice these points.

The calibration method is insensitive to the GPS errors. The method is applied in a static position, it is hence not sensitive to the position errors and is not degraded by an abnormal operation of a GPS.

The calibration method is insensitive to the INS bias. The misalignment (boresight) angles are calculated in a local navigation reference system, the calculation is not affected by heading or attitude errors, because these latter are constant during the different scan measurements.

The calibration method eliminates the three main sources of error during a traditional INS-Lidar calibration and hence allows to obtain a greater accuracy.

The conventional methods of calibration of the misalignment angles do not allow to calculate a reliable factor of quality. On the contrary, the proposed method of calibration allows to calculate a standard deviation representative of the uncertainties linked to the measurements of the calibration.

Finally, the implementation of the proposed method of calibration is simple. The conventional methods proposed until know generally impose to implement the INS and the Lidar on a vehicle, and to find a clear site to have a very accurate GPS RTK signal. The proposed method allows to calibrate a Lidar system indoor: it is just required to have a wall and a orientable platform to generate several orientations of the system. This is particularly well adapted to the manufacturing of INS-lidar coupled systems, where the calibration can hence be performed at the factory. The use of an automated two-axes table may allow to fully automatize the calibration.

Finally, the method allows to reduce considerably the duration of the calibration method. The conventional methods impose many handling operations, during the measurement acquisitions and during the processing of the calibration measurements. The proposed method allows to perform a calibration in a few minutes once the navigation system correctly aligned.

Finally, it is not necessary to have a lidar with a great rotation speed of the mirror, because the calibration is made statically.

The invention claimed is:

1. A method of calibration of a navigation and pointing system including a navigation unit integrally connected to a pointing device, the navigation unit being configured to measure the position and the orientation of a reference system of said navigation unit, the pointing device including an emission device configured to emit a beam in a pointing direction and a means for varying the pointing direction, the pointing device being configured to measure a pointing signal as a function of the pointing direction in a reference system linked to the pointing device, the calibration method comprising the following steps of calibration of the angles between the reference system of said navigation unit and the reference system linked to the pointing device:

a. estimating an approached navigation reference system, the approached navigation reference system being inclined with respect to the navigation reference system with misalignment Euler angles (φ, θ, Ψ);
   b. selecting a first planar surface;
   c. determining a vector ($N_8$) normal to said first planar surface in the navigation reference system;
   d. directing the navigation and pointing system in a plurality of distinct angular orientations with respect to the first planar surface, said plurality of angular orientations being determined in the reference system of the navigation unit;
   e. varying the pointing direction to acquire, by the pointing device, for each of the orientations of said plurality of orientations with respect to the first planar surface, a series of pointing measurements along a scan line on the first planar surface;
   f. processing each of said series of pointing measurements along a scan line on the first planar surface, to determine, in the reference system linked to the pointing device, an approached direction vector ($\hat{u}_1, \hat{u}_2, \hat{u}_3$) of each scan line on the first planar surface;
   g. processing a plurality of approached direction vectors ($\hat{u}_1, \hat{u}_2, \hat{u}_3$) of a plurality of scan lines on the first planar surface, to deduce therefrom an approached normal vector ($\hat{N}_8$) of the first planar surface; and
   h. calculating at least one misalignment angle (φ, θ, Ψ) between the approached normal vector ($\hat{N}_8$) determined at step g) in the approached navigation reference system and the normal vector ($N_8$) determined at step c) in the reference system of the navigation unit.

2. The method of calibration of a navigation and pointing system according to claim 1, further comprising the following steps:

i. selecting a second planar surface;
   j. determining a vector ($N_9$) normal to said second planar surface in the navigation reference system;
   k. directing the navigation and pointing system in a plurality of distinct angular orientations with respect to the second planar surface, said plurality of angular orientations being determined in the reference system of the navigation unit;
   l. varying the pointing direction to acquire, by the pointing device, for each of the orientations of said plurality of orientations with respect to said second planar surface, a series of pointing measurements along a scan line on the second planar surface;
   m. processing each of said series of pointing measurements along a scan line on the second planar surface s as to determine, in the reference system linked to the pointing device, an approached direction vector ($\hat{u}_5, \hat{u}_6$) of each scan line on the second planar surface;
   n. Processing a plurality of approached direction vectors ($\hat{u}_5, \hat{u}_6$) of a plurality of scan lines on the second planar surface to deduce therefrom an approached normal vector ($\hat{N}_9$) of the second planar surface;
   o. calculating at least another misalignment angle (φ, θ, Ψ) between the approached normal vector ($\hat{N}_9$) determined at step n) in the approached reference system of navigation and the normal vector ($N_9$) determined at step j) in the reference system of the navigation unit.

3. The calibration method according to claim 1, wherein said plurality of angular orientations includes the four following angular orientations of the navigation and pointing system with respect to the first planar surface, where r denotes the roll angle, t the pitch angle, and c the heading angle of the navigation and pointing system with respect to a local reference system, having axes X and Y in the horizontal plane and the axis X parallel to the plane of the first planar surface:

Orientation 1: (r, t, c)=(0, 0, 0±5 deg.),
Orientation 2: (r, t, c)=(0, 0, 180±5 deg.),
Orientation 3: (r, t, c)=(0, 0, 55±25 deg.),
Orientation 4: (r, t, c)=(0, 0, −55±25 deg.),
and/or the two following angular orientations of the navigation and pointing system with respect to the second planar surface (9):
Orientation 5: (r, t, c)=(0, 55±25 deg., 0), and
Orientation 6 (r, t, c)=(0, −55±25 deg., 0).

4. The calibration method according to claim 1, wherein step e) and/or step l) includes a plurality of scans of a same scan line, and
wherein said series of pointing measurements along a scan line is obtained by calculation of an average of the plurality of scans of a same scan line.

5. The calibration method according to claim 1, wherein step g) and/or step n) of determining an approached normal vector includes a step of determining an eigenvector associated with the smallest eigenvalue of a main component analysis of the series of pointing measurements along said plurality of scan lines or a step of calculating an average of a plurality of normal vectors measured by vector product of the approached direction vectors of two different scan lines determined at step f) and/o at step m).

6. The calibration method according to claim 1, wherein step h) and/or step o) of calculation of the misalignment angles ($\Phi$, $\theta$, $\Psi$) includes a step of maximizing a scalar product $<\hat{u}, \hat{N}>$ to deduce therefrom an estimation of a misalignment angle, said step of maximizing including a step of processing by a nonlinear least squares regression method or by a linear least squares regression method or a Quasi-Newton method.

7. The calibration method according to claim 1, further comprising a step of calculating an indicator of accuracy of the misalignment angles ($\Phi$, $\theta$, $\Psi$).

8. A navigation and pointing system, comprising:
a navigation unit integrally connected to a pointing device, the navigation unit being configured to measure the position and orientation of a reference system of said navigation unit, the pointing device comprising an emission device configured to emit a beam in a pointing direction and a means for varying the pointing direction, the pointing device being configured to measure a pointing signal as a function of the pointing direction in a reference system linked to the pointing device;
one or more processors configured to process measurements of position and orientation of the navigation unit and process the pointing signal; and
a calibration device configured to implement an angular calibration between the reference system of said navigation unit and the pointing reference system following the calibration method according to claim 1.

9. The navigation and pointing system according to claim 8, wherein said navigation unit includes an orientation system among an inertial navigation unit or an Attitude and Heading Reference System (AHRS) attitude unit and/or a Global Positioning System (GPS) positioning system.

10. The navigation and pointing system according to claim 8, wherein said pointing device includes a two-dimensional-plane scanning lidar, a three-dimensional scanning lidar, or a sonar.

11. The navigation and pointing system according to claim 8, further comprising a means for angular orientation of said navigation and pointing system configured to direct said navigation and pointing system in a plurality of distinct angular orientations with respect to said first planar surface and/or, respectively, to said second planar surface.

12. The calibration method according to claim 2, wherein said plurality of angular orientations includes the four following angular orientations of the navigation and pointing system with respect to the first planar surface, where r denotes the roll angle, t the pitch angle, and c the heading angle of the navigation and pointing system with respect to a local reference system, having axes X and Y in the horizontal plane and the axis X parallel to the plane of the first planar surface:

Orientation 1: (r, t, c)=(0, 0, 0±5 deg.),
Orientation 2 (r, t, c)=(0, 0, 180±5 deg.),
Orientation 3: (r, t, c)=(0, 0, 55±25 deg.),
Orientation 4: (r, t, c)=(0, 0, −55±25 deg.),
and/or the two following angular orientations of the navigation and pointing system with respect to the second planar surface (9):
Orientation 5: (r, t, c)=(0, 55±25 deg., 0), and
Orientation 6: (r, t, c)=(0, −55±25 deg., 0).

13. The navigation and pointing system according to claim 9, wherein said pointing device includes a two-dimensional-plane scanning lidar, a three-dimensional scanning lidar, or a sonar.

14. The navigation and pointing system according to claim 9, further comprising a means for angular orientation of said navigation and pointing system configured to direct said navigation and pointing system in a plurality of distinct angular orientations with respect to said first planar surface and/or, respectively, to said second planar surface.

* * * * *